United States Patent [19]

DiGiovanni et al.

[11] Patent Number: 5,058,976

[45] Date of Patent: Oct. 22, 1991

[54] SYSTEM COMPRISING ER-DOPED OPTICAL FIBER

[75] Inventors: David J. DiGiovanni, Scotch Plains; Kenneth L. Walker, New Providence, both of N.J.

[73] Assignee: AT&T Bell Laboratories, Murray Hill, N.J.

[21] Appl. No.: 562,770

[22] Filed: Aug. 3, 1990

[51] Int. Cl.$^5$ .............. G02B 6/28; H01S 3/091; H04J 3/00; G02F 1/00

[52] U.S. Cl. .................... 359/173; 372/70; 307/4; 65/3.12; 359/341; 385/27; 385/15; 385/24

[58] Field of Search .............. 350/96.10, 96.15, 96.16, 350/96.30–96.34; 455/610–612, 619; 372/70; 307/4; 65/3.11, 3.12

[56] References Cited

U.S. PATENT DOCUMENTS

| | | | |
|---|---|---|---|
| 4,699,464 | 10/1987 | Cohen et al. | 350/96.34 |
| 4,778,238 | 10/1988 | Hicks | 350/96.16 X |
| 4,922,481 | 5/1990 | Hicks | 350/96.16 X |
| 4,923,279 | 5/1990 | Ainslie et al. | 350/96.30 |

OTHER PUBLICATIONS

"Review of Rare Earth Doped Fibre Lasers and Amplifiers", by P. Urquhart, *IEE Proceedings*, vol. 135, (Pt. J., No. 6), pp. 385–407, Dec. 1988.

"Erbium-Doped Fibers: Tomorrow's Repeaters", by E. Desurvire, Lasers and Optronics, May 1990, pp. 55–63.

"Three-Level Fiber Laser Amplifier: A Theoretical Model", by J. R. Armitage, *Applied Optics*, vol. 27, No. 23, Dec. 1988, pp. 4831–4836.

"Efficient, High Power, High Gain, Er$^{3+}$ Doped Silica Fibre Amplifier", by F. F. Massicott, *Electronics Letters*, vol. 26, No. 14, Jul. 1990.

"FA8 Gain Characteristics of Er$^{3+}$ Doped Fiber With Quasiconfined Structure", by N. Kagi, *Program of the Optical Fiber Communication Conference*, San Francisco, Jan. 22–26, 1990, 1990 Technical Digest Series, vol. 1, Conference Edition, Paper FA8.

*Primary Examiner*—Akm Ullah
*Attorney, Agent, or Firm*—E. E. Pacher

[57] ABSTRACT

The inventive optical fiber communication system comprises Si-based amplifier fiber whose core comprises Ge, Al, and Er. The amplifier fiber has an effective index difference ($\Delta n$) greater than 0.03, an effective core diameter a less than 3.5 $\mu m$, a maximum Al concentration in the core of at least 6 mole %, a mode field diameter at the pump wavelength that is less than 5 $\mu m$, a V-number at the pump wavelength in the range 1.4–2.0, a cut-off wavelength less than 1.4 $\mu m$, and an Er distribution whose effective diameter is less than that of the Ge distribution. The fiber has advantageous properties including low amplification threshold and noise. Disclosed is also a method of making optical fiber that can be used to produce fiber having characteristics (e.g., $\Delta n > 0.03$, high Al concentration) not generally obtainable with prior art methods. In a particular embodiment the method comprises a partial collapse of a tubular preform prior to completion of core material deposition, completion of core material deposition, and final collapse.

14 Claims, 3 Drawing Sheets

SYSTEM COMPRISING ER-DOPED OPTICAL FIBER

FIELD OF THE INVENTION

This invention pertains to systems, exemplarily optical fiber communication systems, that comprise an optical fiber amplifier. The optical fibers of concern herein are $SiO_2$-based Er-doped optical fibers.

BACKGROUND OF THE INVENTION

It has been known for some time that rare-earth ion doped glasses in fiber form could be used as a lasing medium. However, it has only been recently that the possibility of using such fiber as the amplification medium in an optical fiber communication system has begun to be explored seriously. Most interest is currently directed towards fiber that comprises $Er^{3+}$ ions. Among possible pump wavelengths ($\lambda_p$) are those in the 0.8–1.0 $\mu$m range (e.g., 0.98 $\mu$m) and those relatively close to (but below) the anticipated signal radiation wavelength ($\lambda_s$) of about 1.5 $\mu$m (e.g., 1.48 $\mu$m). See, for instance, P. Urquhart, *IEE Proceedings*, Vol. 135 (Pt.J, No. 6) pp. 385–407, December 1988 and the interview with E. Desurvire in *Lasers and Optronics*, May 1990, pp. 55–63.

The principle of amplification of an optical signal in an Er-doped fiber amplifier (EDFA) is known to those skilled in the art. See, for instance, J. R. Armitage, *Applied Optics*, Vol. 27(23), pp. 4831–4836, December 1988. However, in order to be of commercial interest, a fiber design has to be found that has certain desirable characteristics. Among these typically are high efficiency, low noise, low loss and acceptable mechanical properties (e.g., strength). In some cases it is also desirable for the fiber to have high saturation power. In other cases the fiber desirably has a low amplification threshold. By this is meant that net signal amplification can occur at relatively low pump power. Exemplarily, low amplification threshold is an important property for fiber that is to be used in a remotely pumped EDFA. Such fiber can, of course, also be used advantageously in other types of EDFA, e.g., locally pumped EDFA, including systems in which more than one pump laser feeds a length of amplifier fiber.

Several design criteria are known to those skilled in the art. For instance, J. R. Armitage (op. cit.) teaches that i) the fundamental pump mode ($LP_{01}$) is the optimum mode with which to pump the EDFA; and
ii) the preferred dopant (i.e., $Er^{3+}$) profile is one in which the dopant ions are confined just to the central region of the fiber core.

That author also states that, for a given form of the Er-profile, there exists a core size with which to achieve maximum amplification. Generally the optimum core provides for maximum overlap of the pump and signal radiation modes. Cores having effective diameter a and effective refractive index difference $\Delta n$ (to be defined below) that result in a V-number at $\lambda_p$ of approximately 3 were stated to be optimal for use in a high gain EDFA.

However, even though at least some design criteria are known, in the design of an actual fiber amplifier trade-offs are frequently necessary. For instance, in practice it may not be possible to produce fiber that meets all the criteria. J. R. Armitage (op. cit.) states as follows: "In practice, control of the dopant profile, particularly for small core sizes, may prove to be difficult due to problems of dopant ion diffusion during the fiber making process. This may then impose a practical limit on how near to optimum it is possible to produce a real fiber."

In co-assigned U.S. patent application Ser. No. 467,699, incorporated herein by reference, fiber having improved operating characteristics (especially with regard to gain characteristics) is disclosed. In particular, the desirability of a relatively large ($\sim 0.03$) refractive index difference between core and cladding is disclosed. In a, also co-assigned, continuation-in-part application of said application, even higher index differences are disclosed. This is a departure from the prior art, which generally uses fibers with considerably lower index differences. See, for instance, J. F. Massicott et al., *Electronics Letters*, Vol. 26(14), 1990, pp. 1038–1039, ($\Delta n \sim 0.013$), and N. Kagi et al., *Program of the Optical Fiber Communication Conference*, San Francisco, 22–26 January 1990, 1990 Technical Digest Series, Vol. 1, Conference Edition, paper FA8 (numerical aperture 0.175, corresponding to $\Delta n \sim 0.0105$).

It is also known that $SiO_2$-based fibers with an $Al_2O_3$—$GeO_2$—$SiO_2$ core can advantageously be used as the amplifier fiber for EDFA, with the presence of Al considered to contribute to high efficiency of the amplification process. See, for instance, J. F. Massicott et al. (op. cit.), wherein a $Al_2O_3$—$GeO_2$—$SiO_2$ fiber is disclosed. See also U.S. Pat. No. 4,923,279 to B. J. Ainslie et al. which discloses a silica-based EDFA fiber with refractive index difference 0.01 and with a core of overall diameter 4 $\mu$m. The core consisted of an inner, Er-doped core region of diameter 1.5 $\mu$m which also contained Si, P and Al, and an outer region that contained Si, Ge, and P. The deposited cladding of the fiber contained Si, P and F, with the P and F concentrations chosen such that the material had a refractive index equal to that of pure fused silica. The Al and Er distributions were apparently co-extensive. The fiber apparently was designed for relatively short $\lambda_p$ (528.7 nm) and apparently was not single mode at $\lambda_p$.

Even though some general design principles are known for EDFA fibers, the prior art does not contain a design for low noise fibers of high efficiency and low amplification threshold. In view of the general importance of these characteristics and, in particular, their importance for a remotely pumped EDFA, it would be highly desirable to have available such designs, and in particular such designs that are manufacturable. Furthermore, it would be highly desirable to have available methods of making fiber that make it possible to attain previously unattainable parameter values. This application discloses both such designs and such methods.

GLOSSARY AND DEFINITIONS

An "optical fiber" is an elongate body adapted for longitudinally guiding therethrough electromagnetic radiation of a predetermined wavelength. It comprises a central region of relatively high refractive index (the core) contactingly surrounded by a region of relatively low refractive index (the cladding).

A "single mode" optical fiber is an optical fiber designed to transmit with low loss only a single mode of radiation of the predetermined wavelength. Of course, a fiber that is a single mode fiber at one wavelength may not be a single mode fiber at another (shorter) wavelength.

A "vapor deposition process" herein is a process that comprises reacting a mixture of precursor gases (e.g., $SiCl_4$ and $O_2$, or $SiCl_4$, $GeCl_4$ and $O_2$) such that $SiO_2$-based reaction product is deposited on a substrate.

An "inside" vapor deposition process herein is a vapor deposition process comprising reacting the precursor gases within a "substrate" tube (generally a $SiO_2$ tube), and causing deposition of the reaction product on the inside of the substrate tube. MCVD is an exemplary inside vapor deposition process.

A "preform" herein is a silica-based elongate glass body of, generally, circular cross section that has a radially varying refractive index and that is an intermediate product in optical fiber manufacture. Thus, a silica substrate is herein not a "preform" (because it does not have a radially varying refractive index). On the other hand, a substrate tube onto whose inner surface has been deposited cladding material (the "deposited" cladding) and at least some core material is herein considered to be a "preform".

The "effective" core diameter a and "effective" refractive index difference $\Delta n$ of a given single mode fiber herein are the core diameter and index difference of a fiber that differs from the given fiber only in having an ideal step index profile of diameter a and "height" $\Delta n = n_c - n_{cl}$, where $n_c$ is the core refractive index of the comparison (step index) fiber and $n_{cl}$ is the refractive index of the cladding region immediately surrounding the core. Those skilled in the art known how to determine a and $\Delta n$ for a given index profile. See, for instance, U.S. Pat. No. 4,699,464.

The "mode field diameter" or "MFD" of a given single mode fiber at a given wavelength is the diameter at which the intensity of transmitted radiation of the given wavelength is (1/e) times the maximum intensity of the radiation. The MFD does not usually coincide with a.

The pump radiation wavelength is herein designated "$\lambda_p$", and the signal radiation wavelength is designated $\lambda_s$.

The outside diameter of the fiber is herein designated D', and the outside diameter of the "deposited" cladding is designated D.

The "amplification threshold" of a given fiber herein is the pump power at which the attenuation of the signal in a short length of the fiber is exactly balanced by the amplification of the signal in the fiber.

The "V-number" of a fiber at a wavelength $\lambda$ can be defined to be approximately equal to $(an_c\pi/\lambda)\sqrt{2\Delta}$, where $\Delta$ is approximately equal to $(\Delta n)/n_c$.

The meaning of "fundamental mode", "$LP_{01}$", and "cut-off wavelength" ($\lambda_{co}$) is well known to those skilled in the art and does not require exposition.

Associated with a given chemical element in the fiber is a distribution of the element, and associated with the distribution is typically a maximum concentration of the element. Concentrations herein are generally expressed in terms of mole percent relative to the total of all cations present. For instance, if the distribution of Al in the core of a Si-based fiber has a maximum at a particular radius, with Si and Al being essentially the only cations present at and near that radius, then the Al distribution has a maximum concentration of x mole % of Al, where $x = 100 \times$ (moles of Al)/(moles of Si + moles of Al), all at the radius.

SUMMARY OF THE INVENTION

In one broad aspect the invention is an optical fiber communication system that comprises silica-based Er-doped fiber amplifier fiber whose parameters are chosen such that the fiber has a relatively low noise, high efficiency, and low amplification threshold, the latter exemplarily being less than 3 mW for $\lambda_s \sim 1.53$ μm and $\lambda_p \sim 1.48$ μm.

A system according to the invention comprises a length of optical fiber that signal-transmissively connects signal-generating means at a first location to signal-detecting means at a second location spaced from the first location. The length of optical fiber comprises a length of "transmission" fiber and a length of Er-doped "amplifier fiber". The system also comprises means for generating pump radiation and means for coupling pump radiation into the length of optical fiber, typically at a location intermediate the first and second locations. The signal-generating means are adapted for generating signal radiation of wavelength $\lambda_s$ (typically about 1.5 μm, e.g., about 1.53 μm) and the means for generating pump radiation are adapted for generating radiation of wavelength $\lambda_p < \lambda_s$. The amplifier fiber comprises a first region of relatively high refractive index (the core) and a second region that contactingly surrounds the first region and has relatively low refractive index (the cladding). The first region comprises, $SiO_2$, Ge, Al, and Er. Associated with the amplifier fiber is an effective index difference $\Delta n > 0.03$, an effective core diameter a that is less than 3.5 μm, and a MFD at $\lambda_p$. Furthermore, the maximum Al concentration in the first region is at least 6 mole %, preferably greater than 10 mole %, and $\Delta n$ and a are chosen such that the MFD at $\lambda_p$ is less than 5 μm, such that the V-number at $\lambda_p$ is in the range 1.4–2.0, and such that the amplifier fiber has a cut-off wavelength ($\lambda_{co}$) that is less than 1.4 μm. The transmission fiber can be conventional.

We have discovered that the presence of Al in the Er-doped core region of an EDFA fiber not only can improve amplification efficiency but also can lower the generation of spontaneous emission noise. The latter effect becomes of significance for Al concentrations of 6 mole % and above, and is expected to increase with increasing Al concentration, at least up to about 30 or even 40 mole %.

We have also discovered that it is not only desirable for the fiber to have a relatively large $\Delta n$ but that concomitantly a should be reduced, generally below 3.5 μm. In order to obtain efficient amplification it is also necessary that the pump radiation be concentrated in the fiber core. This is insured through the above recited V-number, MFD and $\lambda_{co}$ conditions on a and $\Delta n$.

Associated with each core constituent (e.g., Ge, Al, Er) distribution is an effective diameter. By "effective diameter" of a given core constituent distribution we mean herein the diameter (if applicable, the larger of two diameters) at which the concentration of the element has decreased to 10% of the maximum concentration of the element. Effective diameters generally can be measured by known methods. For most efficient amplification and noise reduction it is generally desirable that the Al and $Er^{3+}$ distributions be substantially co-extensive in the fiber, although we have found that it is not a requirement that the maximum of the Er distribution occurs at the center of the core. It is not even necessary that there be a substantial Er concentration right at the axis of the fiber.

In preferred fibers according to the invention the effective diameter associated with the Er distribution is less than that associated with the Ge distribution, and the effective diameter associated with the Al-distribution is not substantially larger (e.g., by at most 10% of the effective diameter of the Er distribution) than that associated with the Er distribution.

In at least some currently preferred fibers the concentration of Er in the core is such that the attenuation of the fiber for 1.53 μm radiation is greater than 2 dB/m, and/or the cladding region comprises F and P. Furthermore, in at least some preferred inventive systems the various system and fiber parameters are chosen such that maximum amplification is attained with amplifier fiber length less than 50 m.

A system according to the invention exemplarily comprises N lengths of amplifier fibers and a multiplicity of lengths of transmission fibers, with at least one length of transmission fiber between any given two lengths of amplifier fibers. The exemplary system further comprises M means for generating pump radiation, with $M \leq N \geq 2$. For $M < N$ the exemplary system comprises a remotely pumped EDFA section, as will be recognized by those skilled in the art.

In a further broad aspect the invention is a method of making a silica-based Er-doped optical fiber that is adapted for use as an amplifier fiber for radiation in the 1.5–1.6 μm range. The novel method makes it possible to produce fiber having parameter values not generally obtainable in combination by prior art methods.

The method comprises providing a silica-based substrate tube, forming a vitreous deposit on the inner surface of the tube, collapsing at least a portion of the tube such that a rod-like preform results, and drawing the optical fiber from the preform. In particular, the method comprises forming a first quantity of vitreous deposit on the inner surface, with the first quantity comprising a portion of the core material. At least a part of the thus produced "tubular preform" is partially collapsed such that the inner diameter of the (at least) portion of the tubular preform is reduced. The inventive method further comprises forming a second quantity of vitreous deposit on the inner surface of the partially collapsed (at least) portion of the tubular preform, with the second quantity typically comprising the remainder of the core material, and collapsing at least a part of the partially collapsed (at least) portion of the tubular preform, such that the rod-like preform results.

In an exemplary embodiment of the inventive method the portion of the core material comprises Si, Ge, and Er, and the remainder of the core material comprises Si and Al, and the partial collapse is carried out such that the final collapse can be accomplished with a single longitudinal pass of an appropriate heating means (e.g., an oxy-hydrogen torch).

A further aspect of the inventive method comprises stretching at least a part of the rod-like preform such that the diameter of the core region is reduced below a critical value $a_c$ that is associated with cracking of the rod-like preform upon cooling to room temperature (exemplarily $a_c \sim 1$ mm). Significantly, the method requires that at least a portion of the rod-like preform is not permitted to cool below 500° C. between completion of the collapse of the tubular preform and completion of stretching.

DETAILED DESCRIPTION OF SOME PREFERRED EMBODIMENTS

Figure 1:
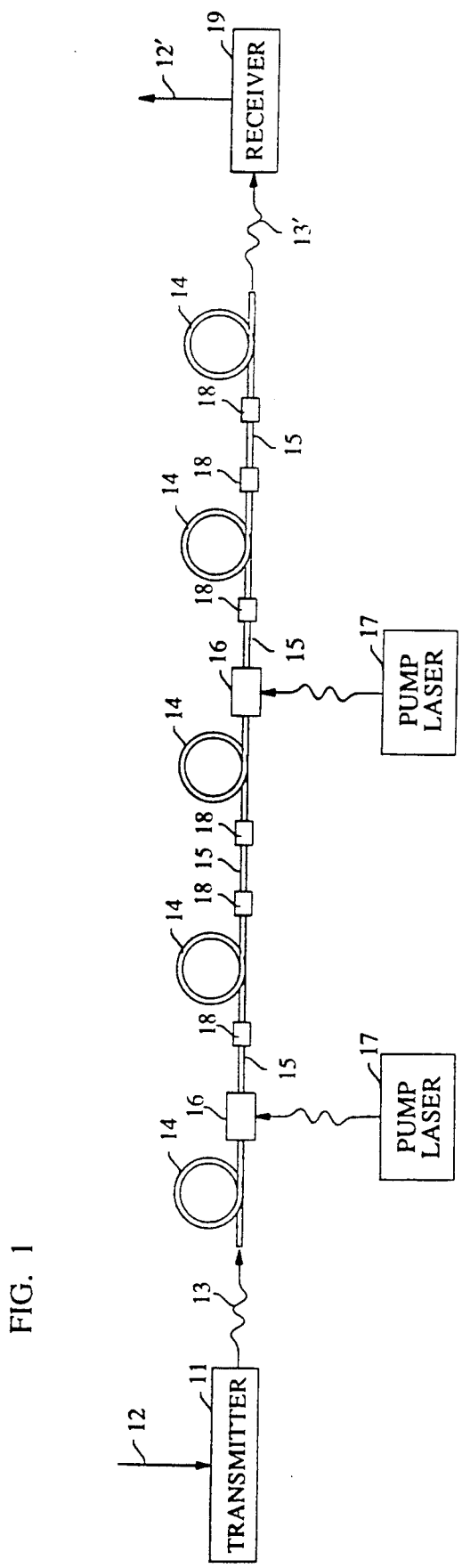
FIG. 1 schematically depicts an exemplary optical fiber communication system that comprises remotely pumped EDFAs.

FIG. 1 schematically depicts an optical fiber communication system 10 that can advantageously comprise EDFA fiber according to the invention and/or produced according to the invention. The system comprises transmitter 11 and receiver 19, with a length of optical fiber (comprising a multiplicity each of transmission fibers 14 and amplifier fibers 15) therebetween. The output radiation 13 of the transmitter is modulated in accordance with signal 12 and is coupled into the optical fiber, is transmitted therethrough and amplified, and radiation 13' is detected in receiver 19, with output 12' available for utilization. The system further comprises pump lasers 17 whose output radiation is coupled into the optical fiber using known means 16, e.g., directional couplers. Known means 18 can be used to couple amplifier fibers 14 and transmission fibers 15. However, in a currently preferred system means 18 are tapered splices of the type disclosed in co-assigned, concurrently filed patent application Ser. No. 07/562,768 entitled Optical Communication System Comprising a Fiber Amplifier", which is incorporated herein by reference. Means 16 cause pump radiation to travel "down stream" in the amplifier fiber.

Although FIG. 1 shows a one-way communication system, with pump radiation co-propagating with the signal pulses, and with some of the EDFA sections being remotely pumped, the invention is not so limited. For instance, pump radiation can be injected into the fiber such that a part of it is co-propagating and another part is counter-propagating. Furthermore, the system could be configured so as to permit two-way communication. Lastly, some or all EDFA sections could be locally pumped. Still other architectures are possible, as will be appreciated by those skilled in the art.

At least one of the amplifier fibers 15 of a communication system according to the invention is an EDFA fiber having a relatively low amplification threshold, preferably less than or equal to 3 mW. In particular the fiber has $\Delta n > 0.03$, the effective core diameter a is less than 3.5 μm, and $\Delta n$ and a are selected such that the fiber has a MFD < 5 μm for the pump radiation (typically $\lambda_p \sim 1.48$ μm), such that the fiber has $\lambda_{co} < 1.4$ μm, and such that the fiber has V-number in the range 1.4–2.0 for $\lambda_p$. Furthermore, the maximum Al concentration in the core of the fiber is at least 6 mole % Al. This combination of parameter values results in a fiber of advantageous properties not available in prior art fibers.

The relatively large value of $\Delta n$, together with the relatively small value of a implied by the stated requirements, causes the intensity of both signal and pump radiation to be relatively large throughout the core region. The relatively low value of $\lambda_{co}$ and the choice of V-number ensure good overlap between pump and signal radiation, and furthermore also ensure good confinement of the pump radiation in the core region.

For both practical and theoretical reasons $\Delta n$ typically should not greatly exceed 0.08. Not only would it be at best difficult to produce a fiber having such a heavily doped core while having acceptable strength and loss, but we currently believe that the performance of the fiber is likely to decrease with increasing $\Delta n$ above about 0.08. The presence of a relatively high concentration of Al in the core (not necessarily uniformly distributed, as will be discussed below) results in improved amplification efficiency and thus contributes to the low amplification threshold of the inventive fiber. It also results in relatively low noise. Below about 6 mole % of Al the effect on noise becomes relatively minor. Above about 30-40 mole % of Al deterioration of fiber properties is likely to occur.

Although U.S. Pat. No. 4,923,279 teaches formation of a co-extensive Al and Er distribution in the preform, we have found it to be more advantageous if in the preform the Er-doped region is spaced from the Al-containing region. Such a preform is more readily manufactured, yet during fiber drawing Er tends to diffuse preferentially into the Al-containing core region.

It is difficult to obtain accurate values of Er concentration. On the other hand, in EDFA fiber the Er ions constitute the main attenuation mechanism for 1.53 $\mu$m radiation. Thus it is common to specify Er concentrations by giving a loss value for that radiation. In preferred fiber according to the invention the Er concentration is such that the fiber has more than 2 dB/m loss at 1.53 $\mu$m. Lower concentrations are undesirable because they require use of relatively long amplifier fibers (resulting in larger contribution of loss mechanisms such as impurities, defects, and core/clad interface stress). An upper limit of desirable Er concentrations is set by the concentration at which Er-Er interactions become significant. Exemplarily this can occur in fiber whose loss exceeds 50 dB/m.

For reasons of cost, handling convenience, compactness of design and noise avoidance some currently preferred systems according to the invention will have EDFA fiber sections whose lengths individually do not exceed about 50 m. Sections of length below about 20 cm are typically undesirable because they are difficult to handle and splice and because they require higher Er concentrations than are readily obtainable. But the length used may vary with application, with low threshold fiber lengths frequently being shorter than the "optimal" EDFA length (which conventionally is the length which gives the highest slope for gain versus power).

The above-described communication system advantageously comprises an EDFA fiber which has parameters which, in combination, are difficult or impossible to attain with prior art fiber processing techniques. In particular, it is difficult or impossible to make a SiO$_2$-based fiber having an acceptably circular Al-and Ge-containing core of large $\Delta n$ (typically>0.03) and small size and mode field diameter, and with the Er ions confined to an interior portion of the fiber core, by conventional techniques. Whereas the discussion below is in terms applicable to an inside deposition process such as MCVD or PMCVD, at least some of the procedures may also be beneficially employed in outside deposition processes such as VAD or OVD, as those skilled in the art will recognize. All these deposition processes are well known and thus do not require any description.

Some of the reasons for the difficulty or impossibility of producing the above described SiO$_2$-based EDFA fibers by a conventional technique are the following:

1) GeO$_2$ incorporation into SiO$_2$ is limited by chemical equilibria. In particular,

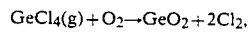

but, at high temperatures,

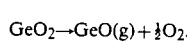

Because of this "burn-off" of Ge it is difficult or impossible to get $\Delta n > 0.03$ by conventional methods.

2) Preform regions containing high Ge and/or Al levels typically cause severe thermal stress, and possibly cracking, in the preforms during cooling. This problem is particularly severe if the highly doped region (i.e., the "core") has a relatively large diameter. On the other hand, the large values of $\Delta n$ of interest herein require that the core deposit be relatively thick, exemplarily at least 50 $\mu$m in a 10 mm ID tube.

3) Because of the above referred-to necessity for relatively thick core deposits together with the desired small core size in the fiber, conventional processing would require the use of a very large diameter substrate tube. Such a tube would at best be very difficult to collapse and/or draw into fiber.

4) Al diffuses readily in vitreous SiO$_2$ and greatly reduces the viscosity of the host material. For this reason it is difficult to produce a fiber with acceptable core circularity if the Al-content of the core region is greater than a few mole %, especially if greater than 6 mole %.

A solution to the cracking problem of point 2) above is as follows: after collapse of the preform tube into a rod-like preform and before cooling of at least a portion of the preform to a temperature below about 500° C. the portion of the preform is stretched such that the diameter of the core region is reduced below a critical value $a_c$ that is associated with cracking upon cooling to room temperature of preforms of the relevant core composition. Exemplarily $a_c$ is about 1 mm or even 0.8 mm. Since typically the ratio of core to outside diameter of the stretched preform portion is larger than is desired for the fiber that is to be drawn from the preform, the stretched portion typically is overclad in conventional manner such that the desired ratio results. Overcladding exemplarily is by a rod-in-tube method, or by fusing of overcladding material to the rod.

In view of the above-discussed reasons 1) and 4), simultaneous incorporation into SiO$_2$ of Ge and Al is problematic since the most appropriate Al-containing precursor is AlCl$_3$, and since the Cl released from AlCl$_3$ forces the Ge equilibrium away from GeO$_2$ and towards GeCl$_4$. This suggests sequential incorporation of Ge and Al. However, simple sequential deposition can not be employed due, inter alia, the low viscosity of Al-doped SiO$_2$ and the affinity of Cl for Ge. Because of the low viscosity it is difficult or impossible to prevent deformation of the core region during collapse of the tubular preform if the Al-containing core material is deposited before the Ge-containing material. Because of the affinity it would be necessary to deposit a considerable thickness of Ge-containing material, if the Ge-containing SiO$_2$ were to be deposited before the Al-containing material. In many cases the necessary thickness would result in an inconveniently large core size.

Although in principle sequential deposition (with Ge-containing material deposited before the Al-containing material) can overcome the problems due to reasons 1) and 4), a currently preferred method comprises partial collapse of the preform tube after deposition of the Ge-containing layer or layers, with the Al-containing layer or layers deposited after the partial collapse. In a preferred embodiment the preform tube is reduced in diameter such that the partially collapsed preform tube has an inside diameter (ID) selected such that final collapse requires only a single pass of the heating means (e.g., torch). Furthermore, and contrary to general practice, in currently preferred embodiments we use relatively thin-walled substrate tubes, exemplarily tubes having less than half the wall thickness of generally used $SiO_2$ substrate tubes. By way of example, tubes having 25 mm OD (outside diameter) and 19 mm ID are frequently used in the conventional manufacture of optical fiber by the MCVD process, and tubes used in preferred embodiments of the invention have 20 mm OD and 18 mm ID.

There is reason to believe that the presence of Al in $SiO_2$ increases the mobility of $Er^{3+}$ ions in the Al-containing region. Consequently there is a tendency for the $Er^{3+}$ to preferentially diffuse into the Al-containing region.

The preform can be Er-doped by any appropriate technique, including a dip-coating method disclosed in co-assigned U.S. patent application Ser. No. 484,139, filed Feb. 23, 1990 and incorporated herein by reference, or by vapor deposition. Currently preferred embodiments of the instant invention use the above referenced dip-coating method. The method exemplarily comprises coating the inside of the preform tube with a TEOS (tetraethylorthosilicate) sol-gel material that contains $Er^{3+}$ and, optionally, Al. In preferred embodiments the substrate tube is fire polished before dip coating, and a further Ge-containing layer is deposited over the $Er^{3+}$-doped layer before partial collapse and deposition of the Al-containing layer or layers.

Figure 2:
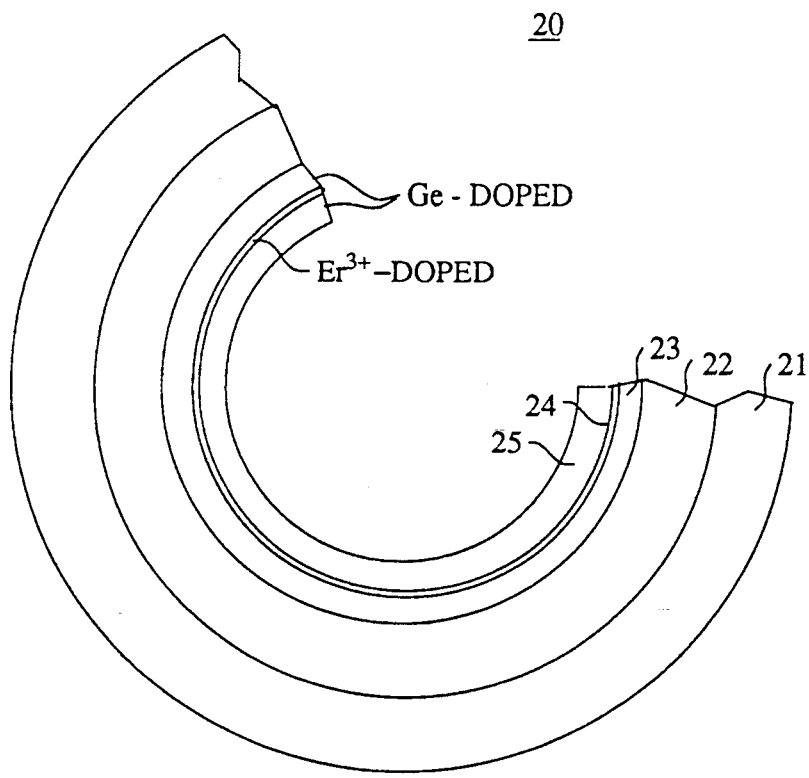
FIGS. 2–3 shows schematically and in cross section, respectively, an exemplary tubular preform before partial collapse and before final collapse.
Figure 3:
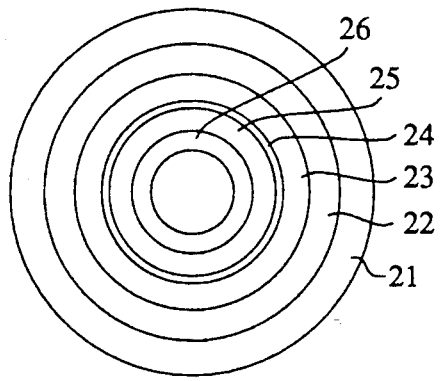
Figure 4:
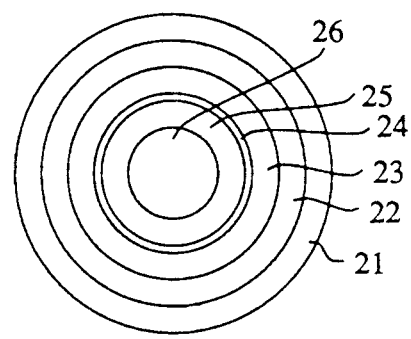
FIG. 4 shows schematically in cross section the rod-like preform formed from the tubular preform of FIG. 3.

FIGS. 2-4 illustrate stages in the making of a preform according to the invention, with FIG. 2 depicting the cross section of an exemplary preform tube prior to partial collapse, FIG. 3 that of the partially collapsed preform tube after deposition of the Al-containing material, and FIG. 4 that of the fully collapsed preform. Numeral 21 indicates the $SiO_2$ substrate tube, 22 the deposited cladding (exemplarily containing both F and P, with the concentrations of these two dopants selected such that the refractive index of 22 is substantially the same as that of 21), 23 Ge-containing core material, 24 $Er^{3+}$-containing core material, 25 Ge-containing core material, and 26 Al-containing core material. Optionally there can be a not intentionally doped $SiO_2$ layer between 22 and 23.

It will be understood that the preform of FIG. 4 typically will be overclad with silica before fiber is drawn from the completed preform in conventional manner, the amount of overcladding selected to result in the desired D'/a ratio, where D' is the outside diameter of the fiber.

Figure 5:
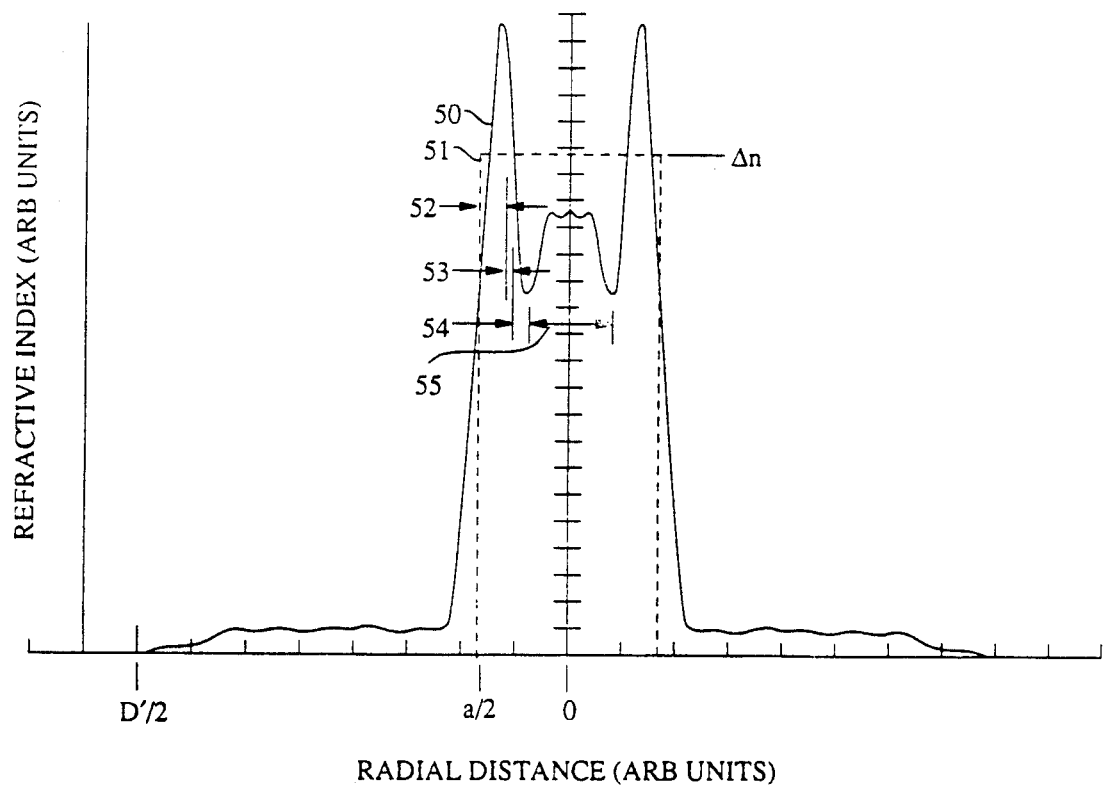
FIG. 5 shows the measured refractive index profile of a preform made according to the invention.

FIG. 5 shows the measured index profile of an exemplary preform according to the invention, with the base index corresponding to $n_o$, the refractive index of vitreous $SiO_2$. Line 50 indicates the measured actual profile, and dash line 51 the corresponding effective step-index profile of diameter a and "height" $\Delta n$. In the exemplary case the maximum refractive index difference is greater than 0.05, and the effective index difference ($\Delta n$) is 0.046. FIG. 5 also shows the radial distance D/2 that corresponds to the OD of the deposited cladding, and regions 52-55 which are, respectively, the outer Ge-containing core region, the Er-doped core region, the inner Ge-containing core region, and the Al containing core region. The above terminology is meant to be descriptive and does not imply exclusivity. For instance, the terminology is not intended to imply that region 53 contains only $SiO_2$ and Er. Not only may 53 contain also some Al (as was mentioned above) but it also contains Ge, as those skilled in the art will undoubtedly appreciate.

Even though in the exemplary preform the $Er^{3+}$ distribution does not overlap with the Al distribution, $Er^{3+}$ has a tendency to preferentially diffuse into the Al-containing region (without necessarily reaching the center of the core). In general the effective diameter of the Er-distribution is smaller than that of the Ge distribution, thereby facilitating a high gain coefficient.

EXAMPLE 1

On conventional MCVD apparatus a preform was produced as follows. A 20×18 mm, commercially available silica tube was prepared in conventional manner, followed by deposition, in conventional manner, of P and F containing matched cladding material of thickness chosen to result in D/a of 4, where D is the outside diameter of the deposited cladding region in the collapsed preform. After fire polishing of the tube, Ge-containing core material was deposited in 2 passes in conventional fashion. The gas flows corresponded to 0.105 g/min of $SiCl_4$, 1.66 g/min of $GeCl_4$, and 1200 cc/min of $O_2$, with the temperature being 1900° C. Subsequently the tube was again fire polished, allowed to cool, dismounted from the MCVD apparatus, the inside coated with an about 0.5 μm thick layer of Er sol (prepared from 26 g TEOS, 45 g $H_2O$, 90 g propanol, 3 drops $HNO_3$, 0.95 g $ErCl_3 \cdot 6H_2O$, with 3 g of $AlCl_3 \cdot 6H_2O$ added to increase Er solubility) and the coating dehydrated by heating for 30 min at 900° C. in 33% $Cl_2$ in $O_2$. After dehydration further Ge-containing core material was deposited (1 pass, 0.078 g/min $SiCl_4$, 1.66 g/min $GeCl_4$, 1200 cc/min $O_2$, 1900° C.), and the tubular preform partially collapsed to an ID of 3 mm (2 passes, 100 cc/min $O_2$, 0.1 g/min $GeCl_4$). Subsequently the Al-containing material was deposited (0.052 g/min $SiCl_4$, 0.055 g/min $AlCl_3$), followed by the final collapse pass. The resulting rod-like preform had an OD of about 12 mm and a core diameter of about 2 mm. Without letting the temperature of the preform drop below 500° C. the preform was stretched such that a substantial portion of the preform was reduced to an OD of about 5 mm. Subsequently an overcladding tube ($SiO_2$, 19×25 mm) was placed over the stretched preform portion and shrunk onto the preform in conventional manner. The thus produced overclad preform had a refractive index profile substantially as shown in FIG. 5, with effective refractive index difference $\Delta n > 0.03$. This rod was again overclad with a 19×25 mm $SiO_2$ tube, and fiber was drawn from the overclad preform and coated, all in conventional manner. The resulting fiber had 125 μm outer diameter, an effective core diameter of about 2.2 μm, a MFD (at $\lambda = 1.5$ μm) of 3.4 μm, and has an amplification threshold ($\lambda_s = 1.53$ μm, $\lambda_p = 1.48$ μm) less than 3 mW.

EXAMPLE 2

Er-doped SiO$_2$-based optical fiber was produced substantially as described in Example 1, except that, after deposition of the P- and F-containing cladding material a relatively thin layer of not intentionally doped SiO$_2$ is deposited in conventional fashion, followed by the deposition of the core material.

We claim:

1. Optical fiber communication system comprising a length of optical fiber signal-transmissively connecting signal-generating means at a first location to signal-detecting means at a second location spaced from the first location; the length of optical fiber comprising a length of transmission fiber and a length of Er-doped amplifier fiber; the communication system further comprising means for generating pump radiation and means for coupling pump radiation into the length of optical fiber at a location intermediate the first and second locations; the signal-generating means adapted for generating signal radiation of wavelength $\lambda_s$ ($\lambda_s \sim 1.5$ $\mu$m), the means for generating pump radiation adapted for generating radiation of wavelength $\lambda_p$ less than $\lambda_s$; the amplifier fiber comprising a first region of relatively high refractive index and a second region, contactingly surrounding the first region, of relatively low refractive index; the first region comprising Ge and Al, and further comprising Er, associated with the amplifier fiber being refractive index difference $\Delta n = (n_c - n_{cl})$, where $n_c$ is an effective refractive index associated with the first region and $n_{cl}$ is a refractive index associated with the second region, an effective core diameter a, a mode field diameter at wavelength $\lambda_p$, an Er distribution, an Al distribution, and a Ge distribution, with each of said distributions being associated an effective diameter;

CHARACTERIZED IN THAT a) $\Delta n > 0.03$ and a is less than 3.5 $\mu$m;
b) the maximum Al concentration in the first region is at least 6 mole %;
c) $\Delta n$ and a are chosen such that the mode field diameter for the pump radiation is less than 5 $\mu$m, such that the V-number at $\lambda_p$ is in the range 1.4–2.0, and such that the amplifier fiber has a cut-off wavelength ($\lambda_{co}$) that is less than 1.4 $\mu$m; and
d) the effective diameter associated with the Er distribution is less than that associated with the Ge distribution, and the effective diameter associated with the Al distribution is not substantially larger than that associated with the Er distribution.

2. The system of claim 1, wherein the maximum Al concentration is more than 10 mole %.

3. The system of claim 1, wherein the concentration of Er in the first region is such that the attenuation of the fiber for 1.53 $\mu$m wavelength radiation is greater than 2 dB/m.

4. The system of claim 1, wherein the length of said amplifier fiber is less than 50 m.

5. The system of claim 1, wherein the second region of the amplifier fiber comprises fluorine and phosphorus.

6. The system of claim 1, wherein $\lambda_p$ is about 1.48 $\mu$m.

7. The system of claim 1, wherein the length of optical fiber comprises N lengths of amplifier fibers and a multiplicity of lengths of transmission fibers, with at least one length of transmission fiber between any given two lengths of amplifier fibers, with $N \geq 2$; and wherein the system further comprises M means for generating pump radiation, with $M \leq N$.

8. The system of claim 7, wherein associated with any given amplifier fiber is an amplification threshold, wherein the amplification threshold of at least one length of amplifier fiber is less than 3 mW.

9. Method of making a silica-based Er-doped optical fiber comprising a core and a cladding and adapted for use as an amplifier fiber for radiation of wavelength in the range 1.5–1.6 $\mu$m; the method comprising a) providing a silica-based substrate tube;
b) forming a vitreous deposit on the inner surface of the tube;
c) collapsing at least a portion of the tube such that a rod-like preform results; the preform comprising core material and cladding material; and
d) drawing the optical fiber from the rod-like preform;

CHARACTERIZED IN THAT step b) and c) comprise e) forming a first quantity of vitreous deposit on the inner surface, the first quantity comprising a portion of the core material, whereby a tubular preform is produced
f) partially collapsing at least a portion of the tubular preform such that the inner diameter of the at least portion of the tubular preform is reduced;
g) forming a second quantity of vitreous deposit on the inner surface of the partially collapsed at least portion of the tubular preform, the second quantity comprising the remainder of the core material;
h) collapsing at least a part of the partially collapsed at least portion of the tubular preform, such that the rod-like preform results.

10. Method of claim 9, wherein the portion of the core material comprises Si, Ge and Er, and wherein the remainder of the core material comprises Si and Al.

11. Method of claim 10, wherein the at least portion of the tubular preform is partially collapsed such that the inner diameter of the at least portion of the tubular preform is reduced to a value that is selected such that the collapse of step h) can be accomplished in a single pass of a heating means.

12. Method of claim 9, wherein after step h) and before step d) at least a part of the rod-like preform is maintained at a temperature above 500° C. and said part of the rod-like preform is stretched such that the diameter of the region that consists of the core material (the core region) is reduced below a critical value $a_c$ that is associated with cracking of the rod-like preform upon cooling to room temperature.

13. Method of claim 12, wherein $a_c$ is at most 1 mm.

14. Method of making a silica-based Er-doped optical fiber adapted for use as an amplifier fiber for radiation of wavelength in the range 1.5–1.6 $\mu$m; the method comprising a) providing a silica-based substrate tube;
b) forming a vitreous deposit on the inner surface of the tube;
c) collapsing at least a portion of the tube such that a rod-like preform results; the preform comprising core material and cladding material and
d) drawing the optical fiber from the rod-like preform;

CHARACTERIZED IN THAT the method further comprises stretching at least a part of the rod-like preform such that the diameter of the region that consists of the core material (the core region) is reduced below a critical value $a_c$ that is associated with cracking of the rod-like preform upon cooling to room temperature, with the temperature of at least the part of the rod-like preform not being permitted to drop below 500° C. during the time from completion of step c) to completion of stretching.

* * * * *